United States Patent
Candelore

(10) Patent No.: US 12,401,863 B2
(45) Date of Patent: Aug. 26, 2025

(54) PLAYBACK CONTROL OF AUDIO CONTENT BASED ON AD-RELATED RESTRICTIONS

(71) Applicant: SONY GROUP CORPORATION, Tokyo (JP)

(72) Inventor: Brant L Candelore, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 69 days.

(21) Appl. No.: 18/166,618

(22) Filed: Feb. 9, 2023

(65) Prior Publication Data
US 2024/0276071 A1    Aug. 15, 2024

(51) Int. Cl.
*H04N 21/81* (2011.01)
*H04N 21/233* (2011.01)
*H04N 21/482* (2011.01)

(52) U.S. Cl.
CPC ......... *H04N 21/812* (2013.01); *H04N 21/233* (2013.01); *H04N 21/482* (2013.01)

(58) Field of Classification Search
CPC ... H04N 21/812; H04N 21/233; H04N 21/482
See application file for complete search history.

(56) References Cited

U.S. PATENT DOCUMENTS

| | | | | |
|---|---|---|---|---|
| 6,771,316 B1 * | 8/2004 | Iggulden | ............ | H04N 21/4622 386/E5.043 |
| 10,841,651 B1 * | 11/2020 | Karnezos | ................ | H04L 67/02 |
| 2003/0055722 A1 * | 3/2003 | Perreault | ............ | G06Q 30/0273 705/14.27 |
| 2004/0012613 A1 | 1/2004 | Rast | | |
| 2015/0143404 A1 * | 5/2015 | Byers | ................ | G06Q 30/0207 725/32 |
| 2017/0048596 A1 * | 2/2017 | Fonseca, Jr. | ............ | G06F 16/48 |
| 2020/0275225 A1 | 8/2020 | Proctor et al. | | |
| 2022/0130077 A1 * | 4/2022 | Rajarathnam | ........... | G06F 3/011 |
| 2023/0409635 A1 * | 12/2023 | Dyoniziak | .......... | G06F 16/7847 |

FOREIGN PATENT DOCUMENTS

WO    2018/170272 A1    9/2018

OTHER PUBLICATIONS https://youtu.be/XpPXVJVH9DA, www.youtube.com.

* cited by examiner

*Primary Examiner* — Chenea Davis
(74) *Attorney, Agent, or Firm* — CHIP LAW GROUP

(57) ABSTRACT

An electronic apparatus and method for control of playback of audio content based on ad-related restrictions is provided. The electronic apparatus acquires the audio content associated with a playback of multimedia content on a display device. The electronic apparatus extracts an audio portion from the audio content. The electronic apparatus generates audio features based on analysis of the audio portion. The electronic apparatus determines the audio portion as an advertisement audio, based on a match between the audio features and information associated with the advertisement audio in a database of advertisement content. The electronic apparatus determines a location of the advertisement audio in a playback timeline of the audio content. The electronic apparatus controls the playback of the audio content via an audio reproduction device, based on the location. The playback is controlled such that the advertisement audio is inaudible in a duration of the playback of the audio content.

20 Claims, 8 Drawing Sheets

PLAYBACK CONTROL OF AUDIO CONTENT BASED ON AD-RELATED RESTRICTIONS

CROSS-REFERENCE TO RELATED APPLICATIONS/INCORPORATION BY REFERENCE

None.

FIELD

Various embodiments of the disclosure relate to multimedia playback control. More specifically, various embodiments of the disclosure relate to an electronic apparatus and method for control of playback of audio content based on ad-related restrictions.

BACKGROUND

Advancements in multimedia delivery have led to development of various solutions that provide users with options to customize viewing experience of the multimedia content. A playback timeline of multimedia content (for example, a television program, a live show, or a live sports event) typically includes slots for advertisements. For some programs, advertisements may occupy a significant portion (for example, 35-40%) of the playback timeline. It may be unpleasant for a user to experience sudden or frequent interruptions in the playback of program content, especially when such interruptions are caused by a long sequence of advertisements. In some instances, the interruption may occur suddenly when the user is immersed in a particular portion of the program content. In some other instances, the user may simply lose interest in the watching the program content if the advertisements have a playback duration that is longer than expected. In linear programming (such as a live broadcast of a baseball game), the user may not even have options to avoid the advertisements that may be inserted at different time slots.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for control of playback of audio content based on ad-related restrictions, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
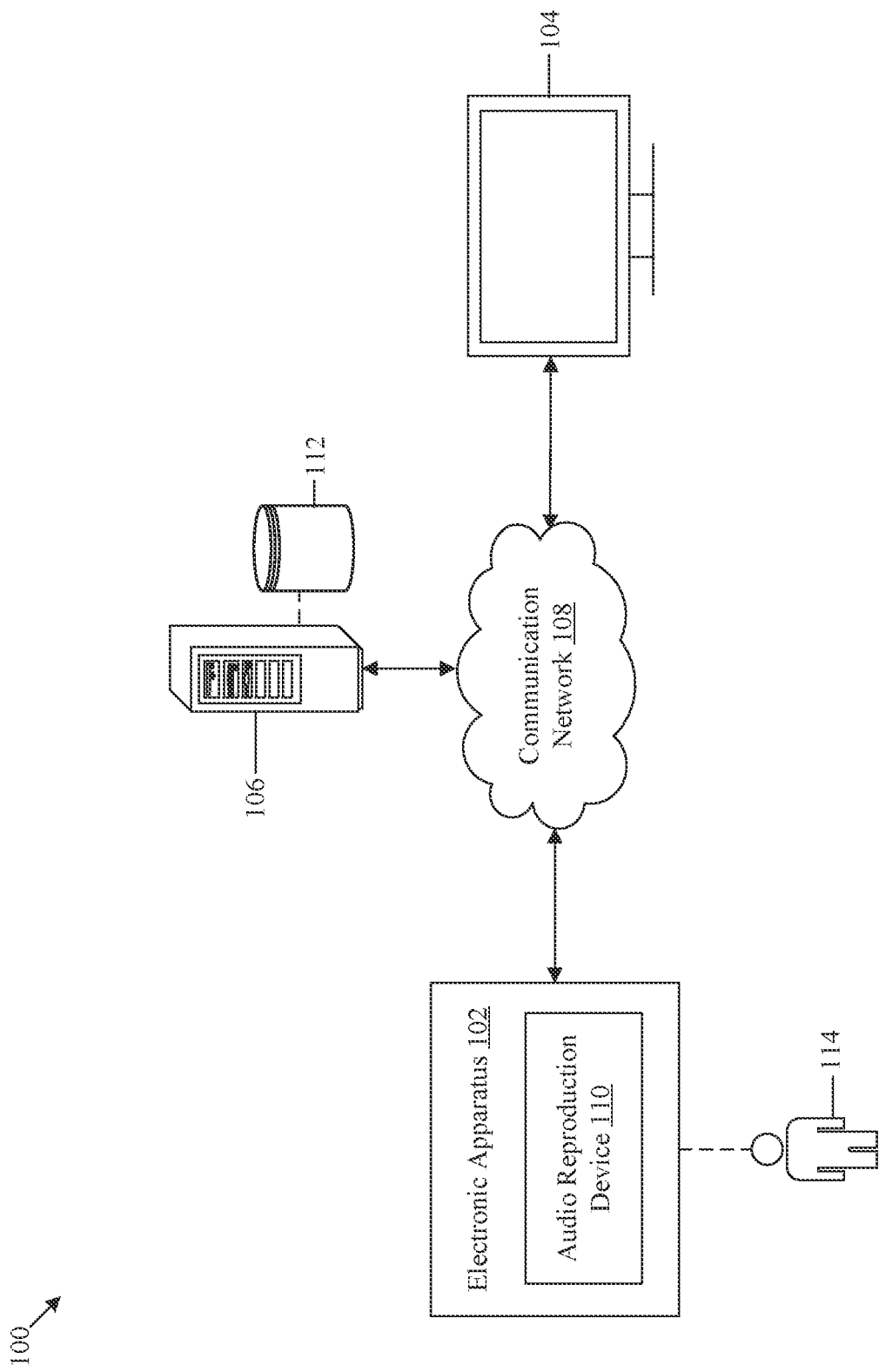
FIG. 1 is a diagram that illustrates an exemplary network environment for control of playback of audio content based on ad-related restrictions, in accordance with an embodiment of the disclosure.

The following described implementations may be found in a disclosed electronic apparatus and method for control of playback of audio content based on ad-related restrictions. Exemplary aspects of the disclosure provide an electronic apparatus (for example, a mobile phone, a smart phone, a desktop, a laptop, a headphone, and the like) that may control the playback of the audio content associated with multimedia content. The electronic apparatus may include an audio reproduction device through which the playback of the audio content may be controlled. The electronic apparatus may acquire the audio content associated with the playback of the multimedia content (for example, a video broadcast, a TV program, or an advertisement video) on a display device. The electronic apparatus may extract an audio portion from the acquired audio content and may generate audio features (for example, an audio fingerprint, speech content in the audio portion, frequency characteristics of the audio portion, and the like) based on analysis of the extracted audio portion. The electronic apparatus may determine the audio portion as an advertisement audio, based on a match between the generated audio features and information associated with the advertisement audio. The information may be included in a database of advertisement content. The electronic apparatus may determine a location of the advertisement audio in a playback timeline of the audio content and may control the playback of the audio content via the audio reproduction device. The playback may be controlled based on the determined location such that the advertisement audio is inaudible in a duration of the playback of the audio content.

Typically, the playback timeline of multimedia content includes advertisement content (include audio and video content associated with advertisements or commercials). A display device may play the advertisement content at one or more slots in the playback timeline of the multimedia content. The playback of the advertisement multimedia content may degrade a viewing experience of the user. The degradation may be due to frequent or abrupt interruptions in the playback of the multimedia content, longer durations of playback of advertisement multimedia content, forced occupancy in viewing of undesired content, or the like. The degradation of the viewing experience of the user may be mostly due lengthy durations of the playback of the advertisement multimedia content in which the user does not have an option to avoid viewing advertisements. The inclusion of the advertisement multimedia content in the playback timeline of the multimedia content may be unavoidable in all scenarios.

To address such issues, playback of audio content associated with multimedia content may be controlled if the audio content is determined as an advertisement audio. The playback of the audio content may be controlled such that a user is not at all or is minimally interrupted by the sound of the advertisement audio. The control of the playback may be such that the advertisement audio may remain inaudible in a period of the playback timeline of the audio content. In some scenarios, the volume or a level of sound associated with the playback of the advertisement audio may be capped to a value below a threshold. If the sound or emotional appeal of the multimedia content (for example, a television program content) differs significantly from that of advertisement multimedia content (i.e., advertisement audio and video, then it is possible that the user may not like the sound of the advertisement while watching the multimedia content. The cap over the volume may help the user to remain in a desired mood and stay unaffected by the sound of the advertisement audio. In some other instances, the control may involve muting an audio device that may be configured to perform the playback of the advertisement audio for a duration of the advertisement audio.

The present disclosure helps to minimize any disruption in the viewing experience due to the appearance of the advertisement audio during the playback of the audio content by enabling the user to skip the playback of the audio content to a location where the advertisement audio terminates. By providing an option to skip the advertisement audio, the electronic apparatus may offer to the user a seamless viewing experience of the multimedia content. If option to skip the advertisement audio is not available, playback of an alternative audio may be initiated. The playback of the alternative audio may continue for a duration of the duration of playback of the advertisement audio. The playback of the alternative audio may provide an uninterrupted viewing experience to the user.

FIG. 1 is a diagram that illustrates an exemplary network environment for control of playback of audio content based on ad-related restrictions, in accordance with an embodiment of the disclosure. With reference to FIG. 1, there is shown a network environment 100. The network environment 100 includes an electronic apparatus 102, a display device 104, and a server 106. The electronic apparatus 102 may communicate with display device 104 and the server 106 through one or more networks (such as a communication network 108). The electronic apparatus 102 may include an audio reproduction device 110. The server 106 may include a database 112. There is further shown a user 114 associated with the electronic apparatus 102. The electronic apparatus 102 may control a playback of audio content associated with a playback of multimedia content on the display device 104. The playback of the audio content may be controlled via the audio reproduction device 110.

The electronic apparatus 102 may include suitable logic, circuitry, interfaces, and/or code that may be configured to determine a location of advertisement audio in a playback timeline of audio content (obtained during the playback of multimedia content on the display device 104) and control the playback of the audio content based on the location. The control may be performed via the audio reproduction device 110 such that the advertisement audio is inaudible in a duration of the playback of the audio content. Examples of the electronic apparatus 102 may include, but may not be limited to, a desktop, a tablet, a laptop, a computing device, a smartphone, a cellular phone, a mobile phone, a consumer electronic (CE) device having a speaker, a wearable device that includes a speaker, a head mounted display headset, a headphone, or a sound card.

The display device 104 may include suitable logic, circuitry, interfaces, and/or code that may be configured to execute playback of multimedia content. The multimedia content may include at least one of a video, a set of images, an animation, and an audio associated with the video. The audio may include background audio, speech sounds, and other audio components, such as an audio description. In accordance with an embodiment, the display device may store multimedia content (recorded by a digital video recorder (DVR)) or may retrieve multimedia content from the DVR for on-demand playback. In accordance with an embodiment, the display device 104 may execute playback of the multimedia content based on multimedia signals received from a set-top-box or a digital TV tuner. Examples of the display device 104 may include a television, a desktop, a tablet, a laptop, or a consumer electronic (CE) device having a display. The display device 104 may include a display screen that may be realized through several known technologies such as, but not limited to, at least one of a Liquid Crystal Display (LCD) display, a Light Emitting Diode (LED) display, a plasma display, or an Organic LED (OLED) display technology, or other display devices.

The server 106 may include suitable logic, circuitry, interfaces, and/or code that may be configured to receive requests from the electronic apparatus 102 for information associated with advertisement content. The requests may be received for determination of whether multimedia content rendered on the display device 104 is an advertisement or not. In accordance with an embodiment, the server 106 may be further configured to receive from the electronic apparatus 102, one or more audio features that may be generated (by the electronic apparatus 102) based on analysis of an extracted audio portion of audio content associated with a playback of multimedia content on the display device 104. In some embodiments, the server 106 may receive the extracted audio portion from the electronic apparatus 102, may analyze the audio portion, and may generate the audio features based on the analysis of the audio portion. The server 106 may be further configured to determine whether the audio content is an advertisement audio based on the generated one or more audio features of the audio portion. The server 106 may be configured to transmit to the electronic apparatus 102 information that indicates whether the audio content is or includes at least a portion of the advertisement audio.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, an advertisement (ad) server, or a combination thereof. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic apparatus 102 as two separate entities. In certain embodiments, the functionalities of the server 106 can be incorporated in its entirety or at least partially in the electronic apparatus 102, without a departure from the scope of the disclosure.

The communication network 108 may include a communication medium through which the electronic apparatus 102, the display device 104, and the server 106 may communicate with each other. The communication network 108 may be a wired or wireless communication network. Examples of the communication network 108 may include, but are not limited to, Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The audio reproduction device 110 may include suitable logic, interfaces, and/or code that may be configured to control the playback of the audio content associated with the multimedia content (rendered on the display device 104). In accordance with an embodiment, the audio reproduction device 110 may receive the audio content from the display device 104 via a sound input device included in the electronic apparatus 102, a wired audio input port included in the electronic apparatus 102, or a wireless audio codec of the electronic apparatus 102. If the audio content is acquired from a sound input device (such as a microphone or a microphone array), then the audio reproduction device 110 may perform a noise cancellation operation to recover the audio that may be corrupted by ambient noise.

In accordance with an embodiment, the audio reproduction device 110 may be a portable wireless speaker, a wearable audio device, or a head-mounted audio device. Examples of the audio reproduction device 110 may include, but may not be limited to, a wireless speaker of a surround sound system, an over-head headphone, an in-ear headphone, a clip-on headphone, a bone-conduction headphone, a hearing aid, smart glasses, or a head-mounted display (for example, an Augmented Reality (AR) headset, Mixed Reality (MR) headset, or Virtual Reality (VR) goggles). The audio reproduction device 110 may rely on a wireless communication protocol, such as Wi-Fi, Bluetooth®, or Bluetooth® Low Energy (BLE) to receive the audio content from the display device 104.

The database 112 may include suitable logic, interfaces, and/or code that may be configured to store advertisement content. The advertisement content may correspond to audio content or multimedia content (i.e., audio and video content) associated with advertisements that may be rendered on the display device 104. In at least one embodiment, the database 112 may store information associated with audio content of a set of advertisements. For example, the information may include audio features corresponding to portions of the audio content of an advertisement. The database 112 may be updated based on a schedule as new advertisements are detected. The electronic apparatus 102 or the server 106 may retrieve information stored in the database 112 and may use the information to determine whether audio content associated with a playback of multimedia content on the display device 104 is advertisement audio. The database 112 may be a relational database, a non-relational database, or a set of files in conventional or big-data storage. The database 112 may be stored or cached on a device, such as the electronic apparatus 102 or the server 106. The device storing the database 112 may be configured to query the database 112 for information associated with advertisement audio. In response to the received query, the device storing the database 112 may be configured to retrieve results from the database 112.

In some embodiments, the database 112 may be hosted on a plurality of servers at same or different locations. The operations of the database 112 may be executed using hardware including a processor, a microprocessor (e.g., to perform or control performance of one or more operations), a field-programmable gate array (FPGA), or an application-specific integrated circuit (ASIC).

In operation, the electronic apparatus 102 may be configured to acquire audio content associated with a playback of multimedia content on the display device 104. The multimedia content may be a television program content (for example, a serial/soap, a talk show, a documentary, a movie, or a news show), Internet content (for example, a podcast, a webcast, streaming media, or downloadable media), a live even (such as a sporting event), a pay-per-view program, an on-demand program (as in video-on-demand (VOD) systems), or a digitally recorded video. The multimedia content may include audio content and associated video content. The video content may be rendered on the display screen of the display device 104.

In accordance with an embodiment, the display device 104 may be associated with an audio output device that may perform playback of the audio content. The electronic apparatus 102 may acquire the audio content as an input via a sound input device (for example, a microphone) included in the electronic apparatus 102, or a wired audio input port included in the electronic apparatus 102. Alternatively, the display device 104 may wirelessly transmit the audio content to the electronic apparatus 102. In such a case, the audio content may be acquired as output of a wireless audio codec of the electronic apparatus 102. For example, the electronic apparatus 102 may establish a Bluetooth® link with the display device 104 for transmission and reception of audio signals between the electronic apparatus 102 and the display device 104. The display device 104 may transmit the audio content to the electronic apparatus 102 via the Bluetooth link@.

The electronic apparatus 102 may be further configured to extract an audio portion from the acquired audio content. In accordance with an embodiment, the electronic apparatus 102 may periodically extract audio portions (e.g., audio frames) from the acquired audio content to determine whether the audio content is an advertisement audio.

After the audio portion is extracted, the electronic apparatus 102 may be configured to generate one or more audio features based on analysis of the audio portion. The extracted audio portion may include a set of audio frames that may span tens of microseconds or hundreds of milliseconds of a playback timeline of the audio content. In accordance with an embodiment, the electronic apparatus 102 may generate the one or more audio features for each audio frame based on analysis of the corresponding frame. The analysis may include, for example, a recognition of one or more types (for example, speech and/or music) of sound in the audio portion, a segmentation of the audio portion into a plurality of audio parts, a grouping of homogeneous audio parts, a determination of audio parameters associated with speech content in the audio portion, and the like. The electronic apparatus 102 may be also configured to determine time-domain or frequency domain information associated with the audio portion for the analysis of the audio portion.

The analysis may enable the electronic apparatus 102 to identify the presence of music or human speech in the extracted audio portion, to perform speech processing or audio processing, and/or to determine a classification label (e.g., a content identifier, a product name, a brand name, or a sentiment or emotional label) for the extracted audio portion. In accordance with an embodiment, the generated audio features may correspond to an audio fingerprint of the audio portion, a text transcript of speech content included in the audio portion, characteristics of the speech content, or frequency characteristics associated with the audio portion.

The electronic apparatus 102 may be further configured to determine the audio portion as an advertisement audio, based on a match between the audio features and information associated with the advertisement audio in the database 112 of advertisement content. The advertisement content may correspond to audio content of a plurality of advertisements (for example, thousands or tens of thousands of advertisements). The database 112 may store information (for example, a set of audio features) associated with audio content of each advertisement. In accordance with an embodiment, the electronic apparatus 102 may compare the generated audio features with the information associated with each advertisement of the plurality of advertisements. The comparison may help to determine whether the generated audio features of the audio content match the information (i.e., the stored audio features) associated with audio content of an advertisement (i.e., the advertisement audio).

The electronic apparatus 102 may be further configured to determine a location of the advertisement audio in a playback timeline of the audio content. The location may correspond to a timestamp (or a set of timestamps that indicate start and end durations of the advertisement audio) in the playback timeline and the determination of the location may be performed based on a location of the extracted audio portion in the playback timeline. For example, the playback timeline of the audio content may be of 30 minutes (i.e., 30:00 (Minutes: Seconds)). The electronic apparatus 102 may determine the location of the advertisement audio as 22:00 in the playback timeline of the audio content based on extraction of the audio portion at 22:00. The electronic apparatus 102 may further determine a length of the advertisement audio in the playback timeline of the acquired audio content, a location from where the playback of the advertisement audio may have been initiated, and a location of termination of the playback of the advertisement audio in the timeline. In accordance with an embodiment, the determination may be performed based on reception of information from the display device 104 or the database 112. For example, once the advertisement audio is determined, the duration of the advertisement audio may be determined from the database 112 as 8 seconds (from 22:00 and 22:08 in the playback timeline).

Based on the determined location, the electronic apparatus 102 may be configured to control a playback of the audio content via the audio reproduction device 110. The playback of the audio content may be controlled such that the advertisement audio remains inaudible in a duration of the playback of the audio content. The electronic apparatus 102 may determine the duration of the playback based on the length of the advertisement audio. In accordance with an embodiment, the audio reproduction device 110 may reduce the sound level of the advertisement audio to a level such that the advertisement audio may be inaudible to the user 114. In some embodiments, the playback of the advertisement audio via the audio reproduction device 110 may be muted. The electronic apparatus 102 may mute the audio reproduction device 110 for the duration of the playback of the audio content. In some other embodiments, the electronic apparatus 102 may be configured to send a signal to the display device 104 to mute a sound output device associated with the display device 104 for the duration of the playback of the audio content.

Figure 2:
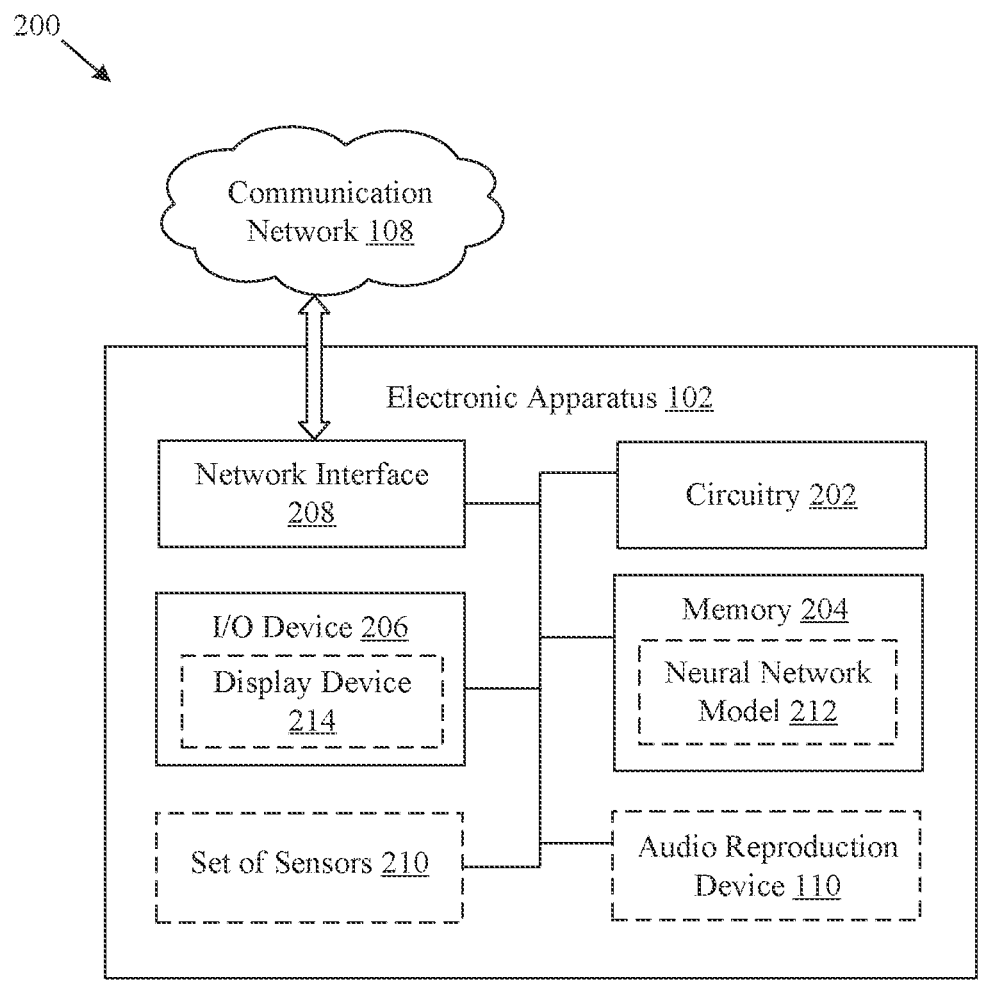
FIG. 2 is a block diagram that illustrates an exemplary electronic apparatus of FIG. 1, in accordance with an embodiment of the disclosure.

FIG. 2 is a block diagram that illustrates an exemplary electronic apparatus of FIG. 1, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206, a network interface 208, a set of sensors 210, and the audio reproduction device 110. In at least one embodiment, the memory 204 may include a neural network model 212. In at least one embodiment, the I/O device 206 may include a display device 214. The circuitry 202 may be communicatively coupled to the memory 204, the I/O device 206, the network interface 208, the set of sensors 210, and the audio reproduction device 110, through wired or wireless communication of the electronic apparatus 102.

The circuitry 202 may include suitable logic, circuitry, and interfaces that may be configured to execute program instructions associated with different operations to be executed by the electronic apparatus 102. The circuitry 202 may include one or more processing units, which may be implemented as an integrated processor or a cluster of processors that collectively perform the functions of the one or more processing units. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored in the memory 204 may enable the circuitry 202 to execute operations of the circuitry 202 (and/or the electronic apparatus 102). In at least one embodiment, the memory 204 may store the audio content acquired by the circuitry 202. The circuitry 202 may determine a sentiment or an emotion label for a sample portion of the stored audio content. The memory 204 may further store an audio portion of the audio content extracted by the circuitry 202. The circuitry 202 may generate audio features based on the analysis of the stored audio portion. The memory 204 may further store the generated audio features. The memory 204 may further store characteristics of voice of the user 114 that may facilitate user voice recognition for processing of voice commands issued by the user 114. In at least one embodiment, the memory 204 may further store the neural network model 212. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input from the user 114. The user input may be indicative of an instruction to mute the playback of the audio content, unmute the playback of the audio content, or skip a playback of an advertisement video that includes the audio content. In some embodiments, the I/O device 206 may receive a user input from the user 116 that may be indicative of a preferred schedule in which the playback of the audio content is to be controlled via the audio reproduction device 110 or a preference for the multimedia content for which the playback of the audio content is to be controlled. Examples of the I/O device 206 may include, but are not limited to, a touch screen, a keyboard, a mouse, a joystick, a microphone, the display device 214, and a speaker. Examples of the I/O device 206 may further include braille I/O devices, such as, braille keyboards and braille readers.

The I/O device 206 may include the display device 214. The display device 214 may include suitable logic, circuitry, and interfaces that may be configured to receive inputs from the circuitry 202 to render, on a display screen, user interface elements via which user inputs may be received. In at least one embodiment, the display screen may be at least one of a resistive touch screen, a capacitive touch screen, or a thermal touch screen. The display device 214 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate communication between the circuitry 202 and the server 106, via the communication network 108. The network interface 208 may be implemented by use of various known technologies to support wired or wireless communication of the electronic apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The set of sensors 210 may include suitable logic, circuitry, and/or interfaces that may be configured to acquire audio content associated with a playback of multimedia content on the display device 104 or capture images of the user 114. The set of sensors 210 may include a sound input device and an image capture device. The sound input device may capture the audio content rendered by a sound output device (for example, a speaker or a sound system) associated with the display device 104. The sound input device may further capture speech input from the user 114 (when the user 114 issues a voice command) and may convert the speech input into an electrical signal for the circuitry 202 for speech recognition and for playback control of the audio content based on the speech input. Examples of the sound input device may include, but are not limited to, an electret microphone, a dynamic microphone, a carbon microphone, a piezoelectric microphone, a fiber microphone, a micro-electro-mechanical-systems microphone, or other microphones.

The circuitry 202 may be further configured to control the image capture device to capture a plurality of images of the user 114. The circuitry 202 may be configured to determine a facial expression of the user 114 based on the plurality of images. The facial expression may indicate one or more motions or positions of muscles of a face of the user 114, where the facial expressions may manifest an emotion. The muscles of the face may move the skin of the user 114, may create facial lines/folds, or may cause the movement of facial features, such as mouth, head, nose, eye, eyebrows of the user 114. The circuitry 202 may be configured to determine the emotional state of the user 114 during the playback of the audio content based on the determined facial expression of the user 114.

In the memory 204, the neural network model 212 may be a computational network or a system of artificial neurons that is typically arranged in a plurality of layers. The layers of the neural network model 212 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network model 212. Outputs of each hidden layer may be coupled to inputs of at least one node in other layers of the neural network model 212. Node(s) in the final layer may receive inputs from at least one hidden layer to output a result. The number of layers and the number of nodes in each layer may be determined from hyper-parameters of the neural network model 212. Such hyper-parameters may be set before, while training, or after training the neural network model 212 on a training dataset.

Each node of the neural network model 212 may correspond to a mathematical function (e.g., a sigmoid function or a rectified linear unit) with parameters that are tunable during training of the neural network model 212. The set of parameters may include, for example, a weight parameter, a regularization parameter, and the like. Each node may use the mathematical function to compute an output based on one or more inputs from nodes in other layer(s) (e.g., previous layer(s)) of the neural network model 212. All or some of the nodes of the neural network model 212 may correspond to same or a different mathematical function. In training of the neural network model 212, one or more parameters of each node of the neural network model 212 may be updated based on whether output of the final layer for a given input (from the training dataset) matches a correct result in accordance with a loss function for the neural network model 212. The above process may be repeated for same or a different input until a minima of the loss function is achieved, and a training error is minimized. Several methods for training are known in art, for example, gradient descent, stochastic gradient descent, batch gradient descent, gradient boost, meta-heuristics, and the like.

The neural network model 212 may include electronic data, which may be implemented as, for example, a software component of an application executable on the electronic apparatus 102. The neural network model 212 may rely on libraries, external scripts, or other logic/instructions for execution by a processing device, such as the circuitry 202. In one or more embodiments, the neural network model 212 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 212 may be implemented using a combination of hardware and software. Examples of the neural network model 212 may include, but are not limited to, a deep neural network (DNN), a convolutional neural network (CNN), an artificial neural network (ANN), a fully connected neural network, a deep Bayesian neural network, and/or a combination of such networks. (DNNs). In some embodiments, the neural network model 212 may correspond to a learning engine that may execute numerical computation techniques using data flow graphs. In certain embodiments, the neural network model 212 may be based on a hybrid architecture of multiple DNNs.

The neural network model 212 may function as a machine learning model with a capability to perform machine learning tasks, viz., audio analysis, voice recognition, a sentiment mining task, and an emotion classification task. The neural network model 212 may include code and routines that may enable a computing device such as the electronic apparatus 102 to generate audio features of an extracted audio portion of the audio content, recognition of a user input, and determination of a sentiment or emotion label for a sample portion of the audio content. When the circuitry 202 extracts a sample portion of the audio content associated with the multimedia content, the neural network model 212 may be used to determine the sentiment label or the emotion label for the sample portion. In some instances, the determination may be performed further based on one or more audio parameters associated with human speech or musical sound detected in the sample portion of the audio content. The neural network model 212, when executed by the circuitry 202, may perform the sentiment mining task to determine the sentiment label for the sample portion as a negative sentiment, a positive sentiment, or a neutral sentiment. Similarly, the neural network model 212 may perform the emotion classification task to determine the emotion label for the sample portion as a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion.

In accordance with an embodiment, the circuitry 202 may apply the neural network model 212 on one image or a plurality of images of the user 114 (captured by the image capture device). The emotional state of the user 114 may be determined based on the application of the neural network model 212 on the image or the plurality of images of the user 114. The emotional state of the user 114 may be determined during a playback of an extracted audio portion of the audio content.

In accordance with an embodiment, the circuitry 202 may extract an audio portion of the audio content associated with a playback of the multimedia content. The circuitry 202 may apply the neural network model 212 on the extracted audio portion to determine audio parameters that may be necessary for identification of sound components included in the audio content. The circuitry 202 may further generate audio features of the extracted audio portion based on the application of the neural network model 212 on extracted audio portion.

The functions or operations executed by the electronic apparatus 102, as described in FIG. 1, may be performed by the circuitry 202. Operations executed by the circuitry 202 are described in detail, for example, in FIGS. 3, 4, 5, 6, and 7.

Figure 3:
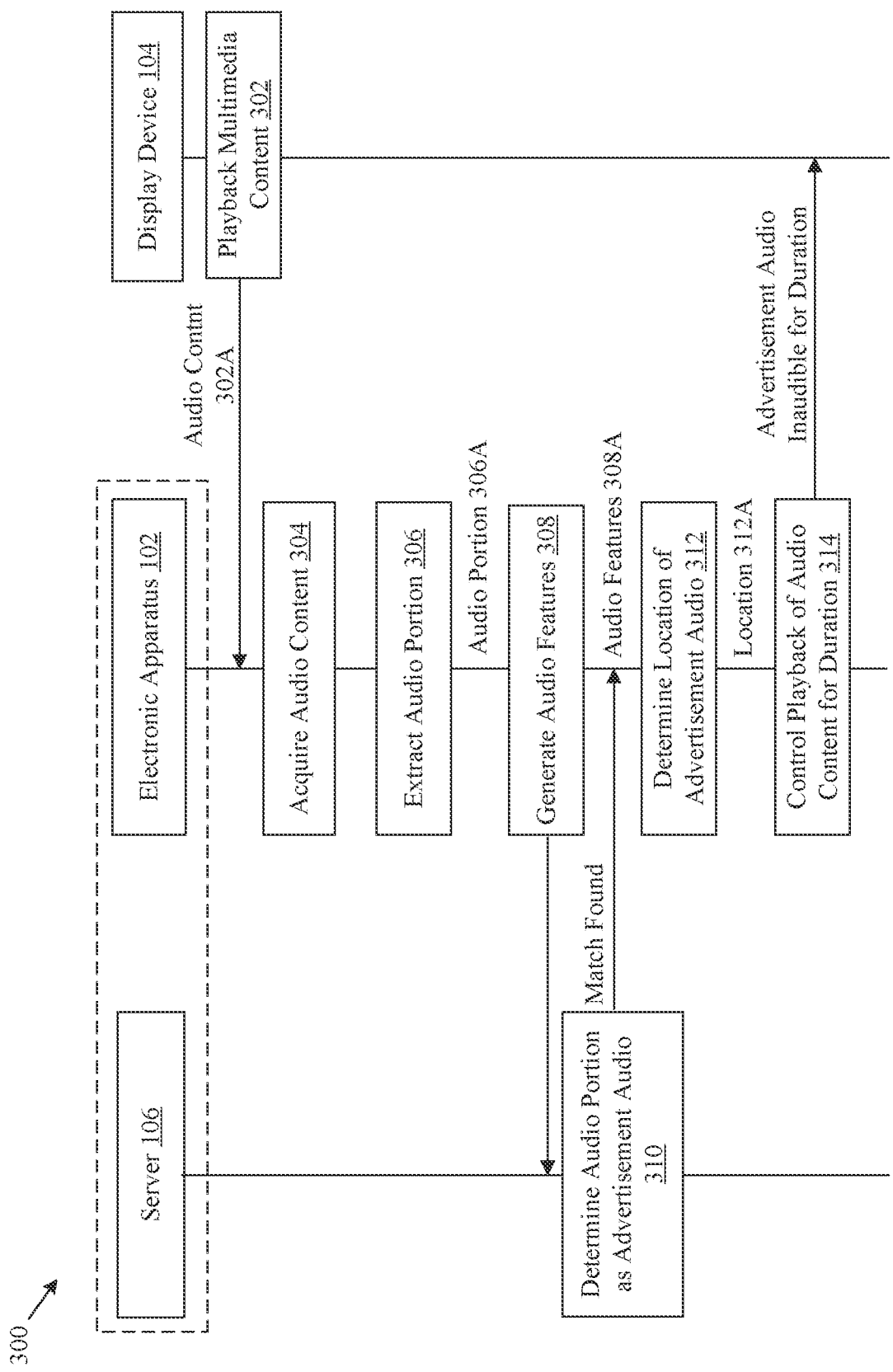
FIG. 3 is a diagram that illustrates exemplary operations to control a playback of audio content based on ad-related restrictions, in accordance with an embodiment of the disclosure.

FIG. 3 is a diagram that illustrates exemplary operations to control a playback of audio content based on ad-related restrictions, in accordance with an embodiment of the disclosure. FIG. 3 is explained in conjunction with elements from FIG. 1 and FIG. 2. With reference to FIG. 3, there is shown a timeline 300 that illustrates exemplary operations from 302 to 314. The exemplary operations may be executed to control the playback of audio content if it is determined that the audio content corresponds to an advertisement audio. The exemplary operations may be executed by one or more components of FIG. 1, such as the electronic apparatus 102, the display device 104, and the server 106. In some embodiments, the functionalities of the server 106 may be incorporated at least partially or in its entirety in the electronic apparatus 102, without a departure from the scope of present disclosure.

At 302, the display device 104 may perform playback of multimedia content. The multimedia content may be, for example, a television program or an Internet-based Video-On-Demand (VOD) content that includes audio content 302A and video content (not shown). The video content may be rendered on the display screen of the display device 104. The display device 104 may execute the playback of the audio content 302A or may wirelessly transmit the audio content 302A to the electronic apparatus 102 for playback.

At 304, the audio content 302A associated with the playback of the multimedia content may be acquired. In at least one embodiment, the circuitry 202 may be configured to acquire the audio content 302A as input of a sound input device of the electronic apparatus 102 included in the electronic apparatus or a wired audio input port included in the electronic apparatus 102. Alternatively, the circuitry 202 may be configured to acquire the audio content 302A as output of a wireless audio codec of the electronic apparatus 102. In some instances, the audio content 302A may be acquired for playback of the audio content 302A via the audio reproduction device 110.

If the display device 104 uses an audio output device for playback of the audio content 302A, then the circuitry 202 may acquire the audio content 302A as the input of the sound input device (for example, a microphone). In case of ambient noise, the circuitry 202 may apply a noise cancellation operation to acquire the audio content 302A (which may be mixed with ambient noise when captured via the sound input device).

In accordance with an embodiment, the circuitry 202 may be configured to acquire the audio content 302A via a wireless communication link (for example, a Bluetooth® link) established between the display device 104 and the electronic apparatus 102. The audio content may be extracted by decoding a Bluetooth® signal received from the display device 104 using the wireless audio codec of the electronic apparatus 102.

At 306, an audio portion 306A may be extracted from the acquired audio content 302A. In at least one embodiment, the circuitry 202 may be configured to extract the audio portion 306A from the acquired audio content 302A. The audio portion 306A may correspond to a particular location in the playback timeline of the audio content 302A.

In some embodiments, the circuitry 202 may be configured to periodically monitor the audio content 302A. In such a case, the audio portion 306A may be periodically extracted (e.g., every 1 second) from the acquired audio content 302A. In these or other embodiments, the extraction may be performed based on a period specified in a user input. The user input may indicate a preferred schedule (i.e., specific time interval) in which the playback of the audio content 302A may have to be controlled or a preference for the multimedia content (rendered at a specific time interval) for which the playback of the audio content 302A may have to be controlled. The extraction of the audio portion 306A and the playback of the audio content 302A may be controlled further based on the received user input. In accordance with an embodiment, the received user input may be a voice command from the user 114. The circuitry 202 may be configured to recognize the voice command to control the playback of the audio content 302A. In some embodiments, the circuitry 202 may apply the neural network model 212 on the received voice command to recognize instructions in the voice command. For example, the user input may indicate that the preferred schedule is 7 PM-10 PM. For every 1 second duration in the period 7 PM-10 PM, the circuitry 202 may extract audio portions from the audio content 302A. In another example, the user input may indicate a television show that may be broadcasted in a period between 8 PM-10 PM on a specific day of the week. The circuitry 202 may extract audio portions from the audio content 302A after every 1 second between 8 PM to 10 PM on the specific day of the week.

At 308, audio features 308A may be generated based on analysis of the extracted audio portion 306A. In at least one embodiment, the circuitry 202 may be configured to generate the audio features 308A. The analysis may include determination of a set of audio parameters that include, for example, a loudness parameter, a pitch parameter, a tone parameter, a voice quality parameter, a phonetic parameter, an intonation parameter, an intensity of overtones, a voice modulation parameter, a prosody parameter, a timbre parameter, a pronunciation parameter, a rate-of-speech parameter, a psychoacoustic parameter, and the like.

In accordance with an embodiment, the circuitry 202 may apply the neural network model 212 on the extracted audio portion 306A for determination of the set of audio parameters. Based on the analysis of the extracted audio portion 306A, the circuitry 202 may determine whether the extracted audio portion 306A is a song, a musical tone, a monologue, a dialogue, a laughter sound, a distress sound, an ambient noise, a background sound, a loud sound, or a defined sound pattern. The analysis of the extracted audio portion 306A may further include determination of time-domain information and frequency-domain information associated with audio content included in the extracted audio portion 306A.

In accordance with an embodiment, the generated audio features 308A may include an audio fingerprint (generated based on a spectrogram of the audio portion 306A) of the audio portion 306A, a text transcript of speech content (generated based on conversion of the speech content to text), characteristics such as loudness, intonation, pitch, rate-of-speech of the speech content in the audio portion 306A, or frequency characteristics, which may be determined based on the frequency-domain information associated with audio content in the audio portion 306A.

At 310, the audio portion 306A may be determined as advertisement audio. In at least one embodiment, the circuitry 202 may be configured to determine the audio portion 306A as advertisement audio (i.e., audio content of a multimedia advertisement). The determination may be based on a match between the generated audio features 308A, and information associated with the advertisement audio in the database 112.

The circuitry 202 may be configured to compare the generated audio features 308A with information associated with audio content of a set of advertisements. The determination of the audio portion 306A as advertisement audio may be based on a match between one or more audio features of the generated audio features 308A and one or more audio features of a set of audio features stored in the database 112.

At 312, a location 312A of the advertisement audio in a playback timeline of the audio content 302A may be determined. In at least one embodiment, the circuitry 202 may be configured to determine the location 312A of the advertisement audio in the playback timeline of the audio content 302A. For example, the playback timeline of the audio content 302A may commence at 20:00:00 (Hours: Minutes: Seconds) and end at 22:00:00 (Hours: Minutes: Seconds). The circuitry 202 may determine the audio portion 306A as audio of advertisement A-1 that occurs at 21:11:15 in the playback timeline.

In some embodiments, the circuitry 202 may be further configured to determine a length of the advertisement A-1. The determination may be based on information associated with the advertisement A-1 in the database 112. For example, the length of the advertisement A-1 may be determined as 14 seconds (i.e., the playback of the advertisement A-1 may commence at the location 21:11:14 and may terminate at the location 21:11:28 in the playback timeline). The advertisement A-1 may be followed by another advertisement A-2. Since A-1 concludes at 21:11:28 (lasts for 14 seconds), the audio portion extracted at 21:11:30 may be advertisement audio of the advertisement A-2.

At 314, a playback of the audio content 302A may be controlled via the audio reproduction device 110. The control may be performed based on the determined location 312A. In at least one embodiment, the circuitry 202 may be configured to control the playback of the audio content 302A via the audio reproduction device 110. The playback may be controlled such that the advertisement audio (i.e., the audio of the advertisement A-1) is inaudible in a duration of the playback of the audio content 302A. Additionally, or alternatively, the playback of the audio content 302A may be controlled based on the length (i.e., 14 seconds) of the advertisement A-1. For example, if the playback of the audio content starts at 21:11:15, then the playback of the audio content 302A may be controlled for a duration of 13 seconds, i.e., from 21:11:15 to 21:11:28 of the audio content 302A. The advertisement audio (i.e., the audio of the advertisement A-1) may remain inaudible for the duration 21:11:15-21:11:28 of the audio content 302A.

In some embodiments, the intensity of sound that results from the playback of the advertisement audio may be capped to a threshold level (for example, 20 dB) for the duration of the playback of the audio content 302A via the audio reproduction device 110. The user 114 may not be able to perceive the sound of the advertisement audio (i.e., the audio content 302A) in that duration. In some other embodiments, the circuitry 202 may mute the audio reproduction device 110 to control the playback of the audio content 302A. The playback of the audio content 302A may be controlled such that the playback of the advertisement audio via the audio reproduction device 110 is suspended for a period that corresponds to the determined location 312A in the playback timeline.

In some instances, the user 114 may be immersed in a program content (for example, last leg of a sports match) and a sudden playback of the advertisement audio (at the determined location 312A) may break the immersion. Based on the determination of the location 312A, an emotion or sentiment of the user 114 may be determined for detection of the level of immersion and amount of control that may be required over the playback of the advertisement audio. In accordance with an embodiment, the circuitry 202 may be configured to extract a sample portion of the audio content 302A that precedes the determined location 312A of the advertisement audio in the playback timeline of the audio content 302A in anticipation of such instances. For example, the circuitry 202 may extract a sample portion that corresponds to a location 21:11:13 or a period 21:11:09-21:11:14 in the audio content 302A. For the sample portion, the circuitry 202 may determine a sentiment or an emotion label based on a machine learning model (for example, the neural network model 212) for a sentiment mining task or a machine learning model for an emotion classification task. The machine learning model may analyze audio frames in the extracted sample portion to determine the set of audio parameters (mentioned in step 308) that describes content (for example, speech content) included in the sample portion of the audio content 302A. The machine learning model may determine the sentiment label (for example, a positive sentiment, or a negative sentiment) or the emotion label (for example, a happy emotion, a sad emotion, an angry emotion, a calm emotion, or a fear emotion) for the sample portion based on the set of audio parameters.

The circuitry 202 may be further configured to determine an emotional state of the user 114. For example, the emotional state of the user 114 may be determined during the playback of the advertisement audio (e.g., from 21:11:15 to 21:11:18). In accordance with an embodiment, the circuitry 202 may control the set of sensors 210 (i.e., the image capture device) to capture a set of images of the user 114 during the period. The circuitry 202 may be further configured to apply the neural network model 212 on the captured set of images of the user 114. The emotional state of the user 114 may be determined based on the application of the neural network model 212 on the captured set of images. The emotional state may be a class label that the neural network model 212 may predict based on facial information included in the set of images. The circuitry 202 may be further configured to compare the emotional state of the user 114 determined during the playback of the advertisement audio and the emotion label for the sample portion. Based on the comparison, the playback of the audio content 302A may be further controlled. By way of example, and not limitation, the circuitry 202 may control the playback of the audio content 302A based on a negative transformation of the emotional state of the user 114. The circuitry 202 may detect the negative transformation based on a determination of a positive emotion label for the sample portion (for example at 21:11:13) and a negative emotional state during the playback of the advertisement audio, for example, at 21:11:18. The playback of the audio content 302A may be controlled such that the advertisement audio is inaudible to the user 114 in a duration 21:11:18-21:11:28 of the audio content 302A. To make the audio content 302A inaudible, the intensity of sound generated by the audio reproduction device 110 may be reduced to a value (below a threshold level (for example, 20 dB)), the playback of the advertisement audio by the audio reproduction device 110 may be muted, or playback of alternate audio via the audio reproduction device 110 may be performed in the duration 21:11:18-21:11:28 of the audio content 302A.

Figure 4:
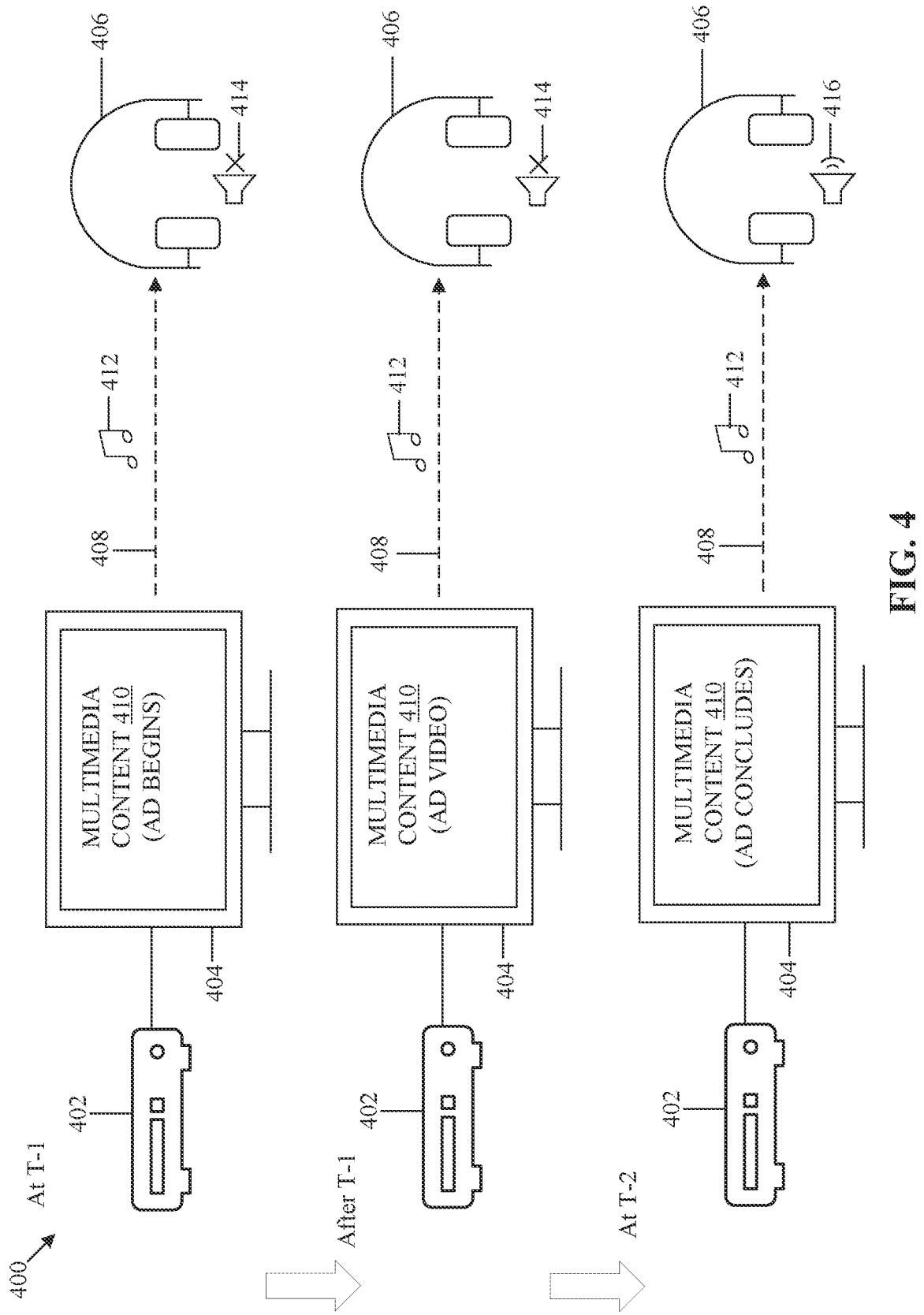
FIG. 4 is a diagram that illustrates an exemplary scenario for control of a playback of an advertisement audio by muting an audio reproduction device, in accordance with an embodiment of the disclosure.

FIG. 4 is a diagram that illustrates an exemplary scenario for control of a playback of an advertisement audio by muting an audio reproduction device, in accordance with an embodiment of the disclosure. FIG. 4 is explained in conjunction with elements from FIG. 1, FIG. 2, and FIG. 3. With reference to FIG. 4, there is shown an exemplary scenario 400. In the exemplary scenario 400, there are shown an Audio/Video (AV) source 402, a display device 404, and an electronic apparatus 406. The display device 404 (for example, a television) may be an exemplary implementation of the display device 104 of FIG. 1. The functionalities of the display device 404 may be identical to that of the display device 104 of FIG. 1. The electronic apparatus 406 (for example, a headphone) may be an exemplary implementation of the electronic apparatus 102. The functionalities of the electronic apparatus 406 may be identical to that of the electronic apparatus 102 of FIG. 1 or FIG. 2. The display device 404 may be connected to the AV source 402 and the electronic apparatus 406 may be connected to the display device 404 via a link 408. The link 408 may be a wired link or a wireless link (for example, a Bluetooth® link or an Infrared link). The electronic apparatus 406 may control a playback of an advertisement audio via an audio reproduction device (for example, a speaker) included in the electronic apparatus 406.

During operation, the display device 404 may perform a playback of multimedia content 410 transmitted by the AV source 402. The multimedia content 410 may include audio content 412 and video content associated with the audio content 412. In accordance with an embodiment, the AV source 402 may be implemented as a storage device that stores the multimedia content 410. Examples of such an implementation of the AV source 402 may include, but are not limited to, a Pen Drive, a Flash USB Stick, a Hard Disk Drive (HDD), a Solid-State Drive (SSD), and/or a Secure Digital (SD) card. In accordance with another embodiment, the AV source 402 may be implemented as a media streaming server that may transmit the multimedia content 410 to the display device 404. In accordance with another embodiment, the AV source 402 may be a television (TV) tuner, such as an Advanced Television Systems Committee (ATSC) tuner which may receive Digital TV (DTV) signals from an over-the-air broadcast network and may extract the multimedia content 410 from the received DTV signal.

The electronic apparatus 406 may be configured to acquire the audio content 412 associated with the playback of the multimedia content 410 on the display device 404. The audio content 412 may be acquired from the display device 404 via the link 408. The link 408 may be a wired link or a wireless link. If the link 408 is a wired link, the audio content 412 may be acquired via a wired audio input port included in the electronic apparatus 406. On the other hand, if the link 408 is a wireless link, the audio content 412 may be acquired as an output of a wireless audio codec of the electronic apparatus 408. During normal use, the electronic apparatus 406 may perform a playback of the audio content 412 via the audio reproduction device of the electronic apparatus 406. The acquired audio content 412 may be television program content (before an instance T-1). At T-1, the electronic apparatus 406 may extract an audio portion from the audio content 412. Once the audio portion is extracted, the electronic apparatus 406 may generate one or more audio features of the audio portion and may determine the extracted audio portion of the audio content 412 as an advertisement audio. The determination may be based on detection of a match between audio features of the audio portion (extracted at the instance T-1) and information associated with the advertisement audio (stored in the database 112 of advertisement content). Based on the audio features of the audio portion (extracted at the instance T-1), it may be determined that the playback of the advertisement audio may have started at T-1.

The electronic apparatus 406 may be configured to determine a location of the advertisement audio in a playback timeline of the audio content 412. The electronic apparatus 406 may determine the instance T-1 as the location of the advertisement audio in the playback timeline. Based on such a determination, the electronic apparatus 406 may control the playback of the audio content 412 via the audio reproduction device of the electronic apparatus 406. The control of the playback of the audio content 412 may be initiated after the determined location (i.e., the instance T-1). In accordance with an embodiment, the electronic apparatus 406 may mute 414 the playback of the advertisement audio via the audio reproduction device of the electronic apparatus 406 for a period to control the playback of the audio content 412. The period for which the playback is muted may correspond to the determined location in the playback timeline. While the electronic apparatus 406 may continue to acquire the audio content 412 during the period, the audio reproduction device of the electronic apparatus 406 may remain in a muted state during that same period.

In accordance with an embodiment, the electronic apparatus 406 may receive information associated with a length of the advertisement audio. Based on the received information, the electronic apparatus 406 may determine that the playback of the advertisement audio may conclude at an instance T-2. Based on such a determination, the electronic apparatus 406 may perform an unmute operation 416 on the playback of the audio content 412 at the instance T-2. The audio reproduction device of the electronic apparatus 406 may initiate the playback the audio content 412 at the instance T-2.

It should be noted that the scenario 400 of FIG. 4 is for exemplary purposes and should not be construed as limiting the scope of the disclosure. For example, advertisements may be repetitive in nature or may occur in a sequence. In such cases, the unmute operation 416 may only performed when it is determined that the audio content is not associated with an advertisement. It is possible to have a delay in application of a mute or unmute operation on audio playback after the advertisement audio is determined. The delay can cause a portion (e.g., few milliseconds of audio) of the advertisement audio to leak out of the audio reproduction device. In some instances, the electronic apparatus 406 may attempt to minimize the delay (if above a threshold duration) by predicting slots in the playback timeline based on historical slot information for advertisements.

Figure 5:
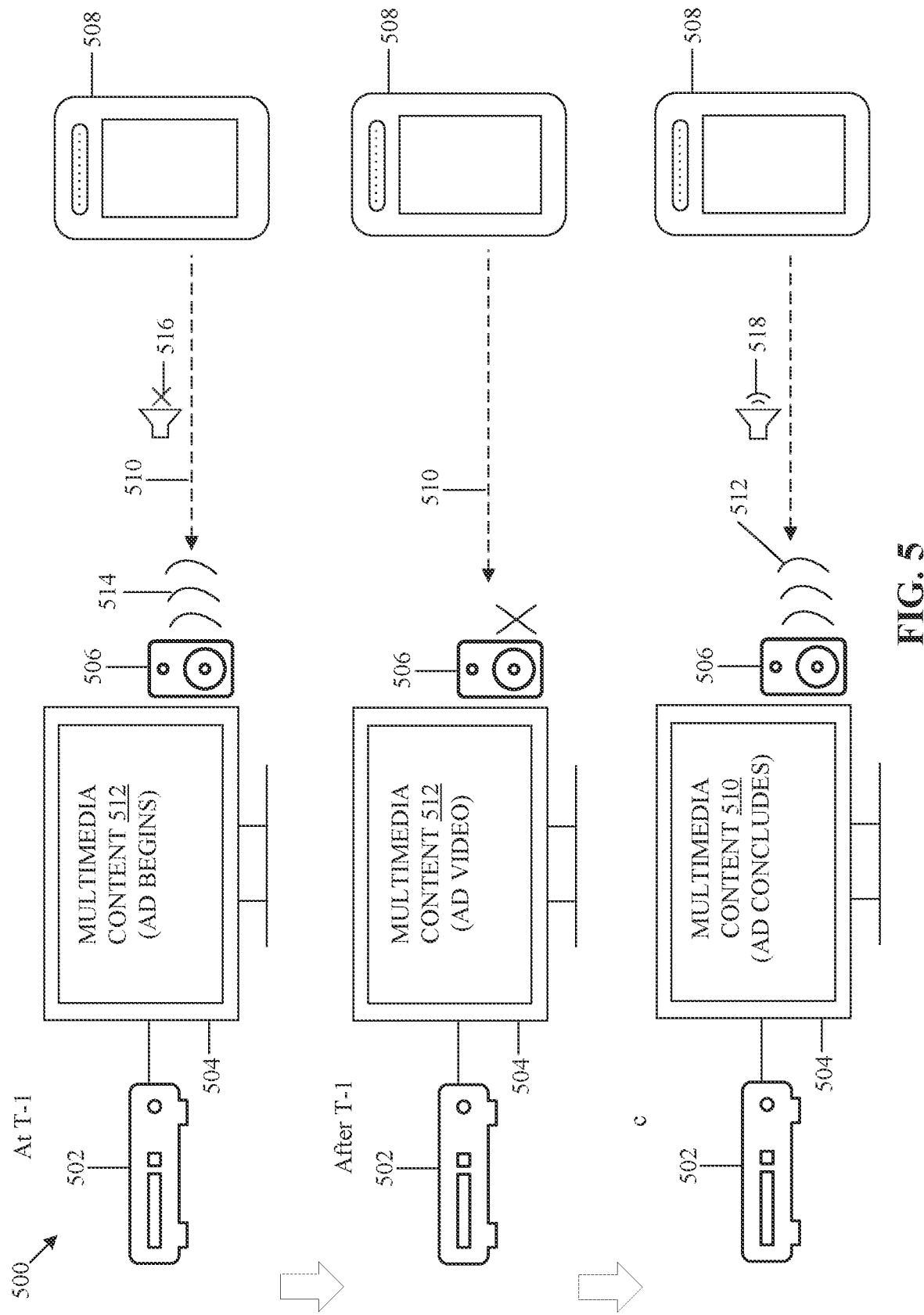
FIG. 5 is a diagram that illustrates an exemplary scenario for playback control of an advertisement audio based on transmission of a signal to mute a sound output device, in accordance with an embodiment of the disclosure.

FIG. 5 is a diagram that illustrates an exemplary scenario for playback control of an advertisement audio based on transmission of a signal to mute a sound output device, in accordance with an embodiment of the disclosure. FIG. 5 is explained in conjunction with elements from FIG. 1, FIG. 2, FIG. 3, and FIG. 4. With reference to FIG. 5, there is shown an exemplary scenario 500. In the exemplary scenario 500 there are shown an AV source 502, a display device 504, an audio output device 506, and an electronic apparatus 508. The implementation of the AV source 502 may be identical to that of the AV source 402 of FIG. 4. The display device 504 (for example, a television) may be an exemplary implementation of the display device 104 of FIG. 1. The functionalities of the display device 504 may be identical to that of the display device 104 of FIG. 1. The electronic apparatus 508 (for example, a mobile phone or a smart phone) may be an exemplary implementation of the electronic apparatus 102. The functionalities of the electronic apparatus 508 may be identical to that of the electronic apparatus 102 of FIG. 1 and FIG. 2. The display device 504 may be connected to the AV source 502 and the audio output device 506. The electronic apparatus 508 may be connected to the display device 504 or the audio output device 506 via a wireless link 510 (for example, a Bluetooth or an Infrared link). The electronic apparatus 508 may control playback of an advertisement audio via an audio output device 506 (for example, a speaker) connected to the display device 504 based on transmission of signals to the display device 504 or the audio output device 506.

During operation, the display device 504 may perform playback of multimedia content 512 transmitted by the AV source 502. The multimedia content 512 may include audio content 514 and video content associated with the audio content 514. The playback of the audio content 514 may be performed via the audio output device 506.

The electronic apparatus 508 may acquire the audio content 514 associated with the playback of the multimedia content 512 via a sound input device of the electronic apparatus 508. Prior to an instance T-1, the audio content 514 may correspond to television program content (i.e., the multimedia content 512). At the instance T-1, the electronic apparatus 508 may determine that the audio content 514 is an advertisement audio. The determination may be performed based on extraction of an audio portion of the audio content 514 and a match between audio features of the audio portion (extracted at the instance T-1) and information associated with the advertisement audio (retrieved from the database 112).

The electronic apparatus 508 may be configured to determine a location of the advertisement audio in a playback timeline of the audio content 514. The location may be determined as the instance T-1. Based on the determination, the electronic apparatus 508 may be further configured to control the playback of the audio content 514 via the audio output device 506. The control of the playback of the audio content 514 may be initiated at the location (i.e., the instance T-1).

In accordance with an embodiment, the electronic apparatus 508 may transmit a first signal 516 (for example, a Bluetooth® signal, an Infrared (IR) command, or a network command) that includes a mute instruction to the display device 504. The playback of the audio content 514 via the audio output device 506 (i.e., connected to the display device 104) may be controlled (i.e., muted) further based on the transmission of the first signal 516. The mute instruction may be transmitted to indicate the determined location (i.e., the instance T-1) of the advertisement audio in the playback timeline of the audio content 514. Thus, the playback of the advertisement audio (i.e., the audio content 514) via the audio output device 506 may be muted at T-1 by the display device 504.

In accordance with an embodiment, the electronic apparatus 508 may estimate a validity period of the mute instruction based on the determined location (i.e., the instance T-1). The validity period may be estimated based on information received from the database 112 about the advertisement audio. The information may include a length of the advertisement audio and the validity period may be estimated based on the location (i.e., the instance T-1) of the advertisement audio in the playback timeline of the audio content 514. Based on the information, the electronic apparatus 508 may determine that the advertisement audio must end at T-2. Thus, the validity period may be estimated to be a period that spans from T-1 to T-2. After the estimated validity period elapses, the electronic apparatus 508 may transmit a second signal 518 (for example, a Bluetooth® signal, an Infrared (IR) command, or a network command) that includes an unmute instruction to the display device 504. For example, the second signal 518 may be transmitted at the instance T-2 as the advertisement audio concludes at the instance T-2. The playback of the audio content 514 may be controlled further based on the transmission of the second signal 518. Specifically, the display device 504 may unmute the audio output device 506 based on a reception of the second signal 518.

It should be noted that the scenario 500 of FIG. 5 is for exemplary purposes and should not be construed as limiting the scope of the disclosure.

Figure 6:
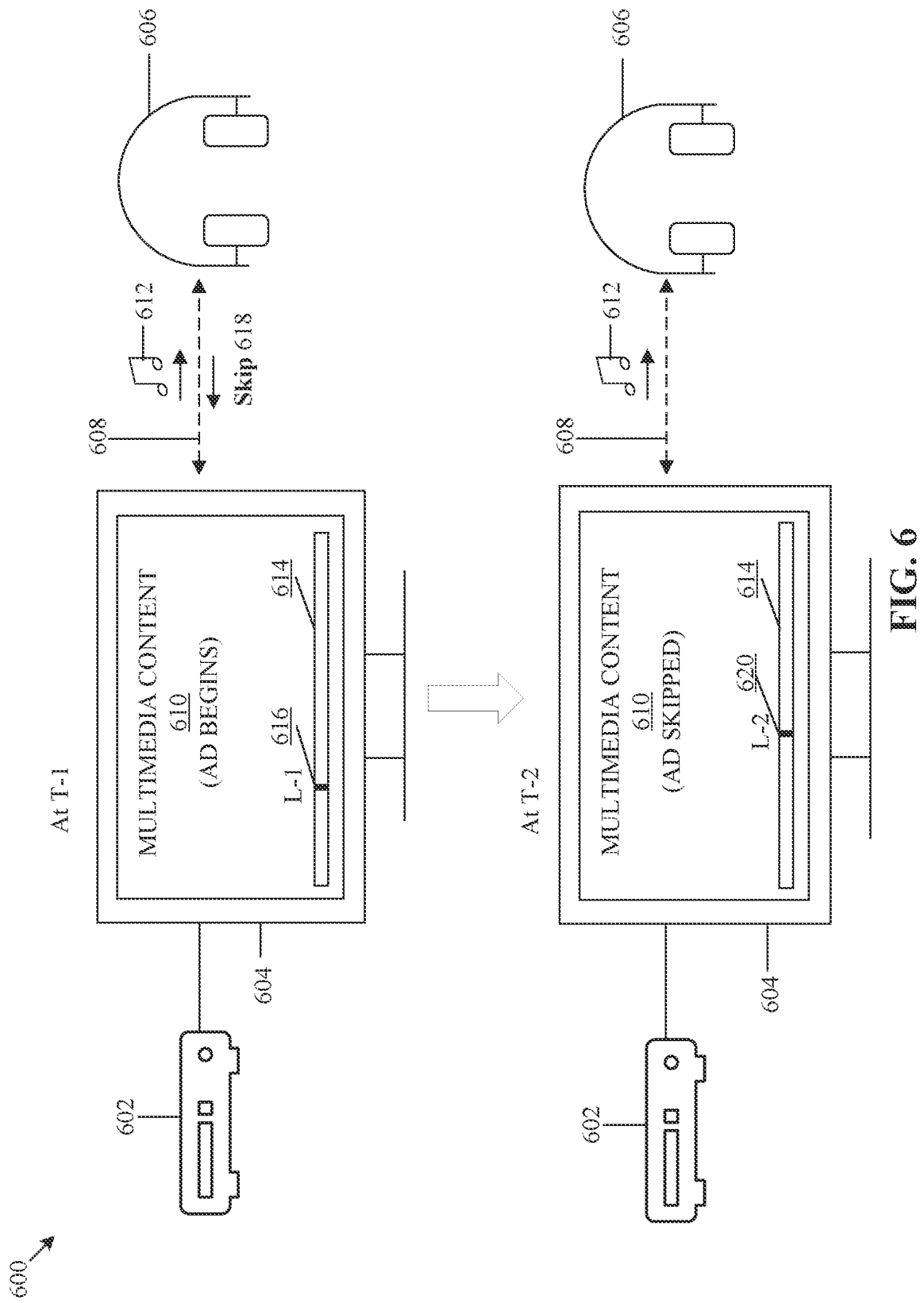
FIG. 6 is a diagram that illustrates an exemplary scenario for playback control of an advertisement audio based on transmission of a signal to skip advertisement audio, in accordance with an embodiment of the disclosure.

FIG. 6 is a diagram that illustrates an exemplary scenario for playback control of an advertisement audio based on transmission of a signal to skip advertisement audio, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In the exemplary scenario 600, there is shown an AV source 602, a display device 604, and an electronic apparatus 606. The implementation of the AV source 602 may be identical to that of the AV source 402 of FIG. 4. The display device 604 (for example, a television) may be an exemplary implementation of the display device 104 of FIG. 1. The functionalities of the display device 604 may be identical to that of the display device 104 of FIG. 1. The electronic apparatus 606 (for example, a headphone) may be an exemplary implementation of the electronic apparatus 102. The functionalities of the electronic apparatus 606 may be identical to that of the electronic apparatus 102 of FIG. 1 and FIG. 2. The display device 604 may be connected to the AV source 602. The electronic apparatus 606 may be connected to the display device 604 via a wireless link 608 (for example, a Bluetooth® link or an Infrared link). The electronic apparatus 606 may control a playback of an advertisement audio based on transmission of a skip instruction to the display device 604.

During operation, the AV source 602 may store multimedia content 610 that includes audio content 612 and associated video content. For example, the multimedia content 610 may be a recorded television program. The display device 604 may perform playback of the multimedia content 610 based on an input received from the electronic apparatus 606. The display device 604 may acquire information associated with a playback timeline 614 of the multimedia content 610 from the AV source 602. The information may include one or more locations in which the audio content 612 may be likely be advertisement audio. The display device 604 may transmit the information associated with the playback timeline 614 of the audio content 612 to the electronic apparatus 606.

The electronic apparatus 606 may acquire the audio content 612 associated with the playback of the multimedia content 610 on the display device 604. The acquisition may be via the wireless link 608. Thereafter, the electronic apparatus 606 may perform playback of the audio content 612 via an audio reproduction device of the electronic apparatus 606.

Before T-1, the audio content 612 associated with the multimedia content 610 may be a recorded television program. At T-1, the electronic apparatus 606 may extract an audio portion of the audio content 612 for analysis. The electronic apparatus 606 may determine that the extracted audio portion of the audio content 612 is an advertisement audio based on audio features of the extracted audio portion. The audio features may match information associated with the advertisement audio stored in the database 112 of advertisement content.

The electronic apparatus 606 may determine a location 616 (i.e., L-1) of the advertisement audio in the playback timeline 614 of the audio content 612. The location 616 (i.e., L-1) may correspond to the instance T-1. Based on the location 616, the electronic apparatus 606 may control the playback of the audio content 612 (i.e., the advertisement content) via the audio reproduction device of the electronic apparatus 606. For recorded content (e.g., DVR content), the display device 604 or an audio device connected to the display device 604 may be controlled to skip a playback of advertisement video that includes the advertisement audio. The electronic apparatus 102 may transmit to the display device 604, a signal 618 (for example, a Bluetooth® signal, an IR command, or a network command) that may be indicative of a skip instruction and a location (for example, L-2 620). The electronic apparatus 606 may determine the location L-2 620 based on the information associated with the playback timeline 614 of the audio content 612. The electronic apparatus 102 may transmit the signal 618 via the via the wireless link 608 at T-1.

The display device 604 may receive the signal 618 at T-2 and may determine that the playback of the advertisement video needs to be skipped based on the signal 618. At T-2, the display device 604 may skip the playback of the multimedia content 610 (that comprises the audio content 612) and may shift a seek position to the location L-2 620 of the playback timeline 614. The skipping action may lead to a resumption of playback of the recorded television program by the display device 604 from T-2.

It should be noted that the scenario 600 of FIG. 6 is for exemplary purposes and should not be construed to limit the scope of the disclosure.

Figure 7:
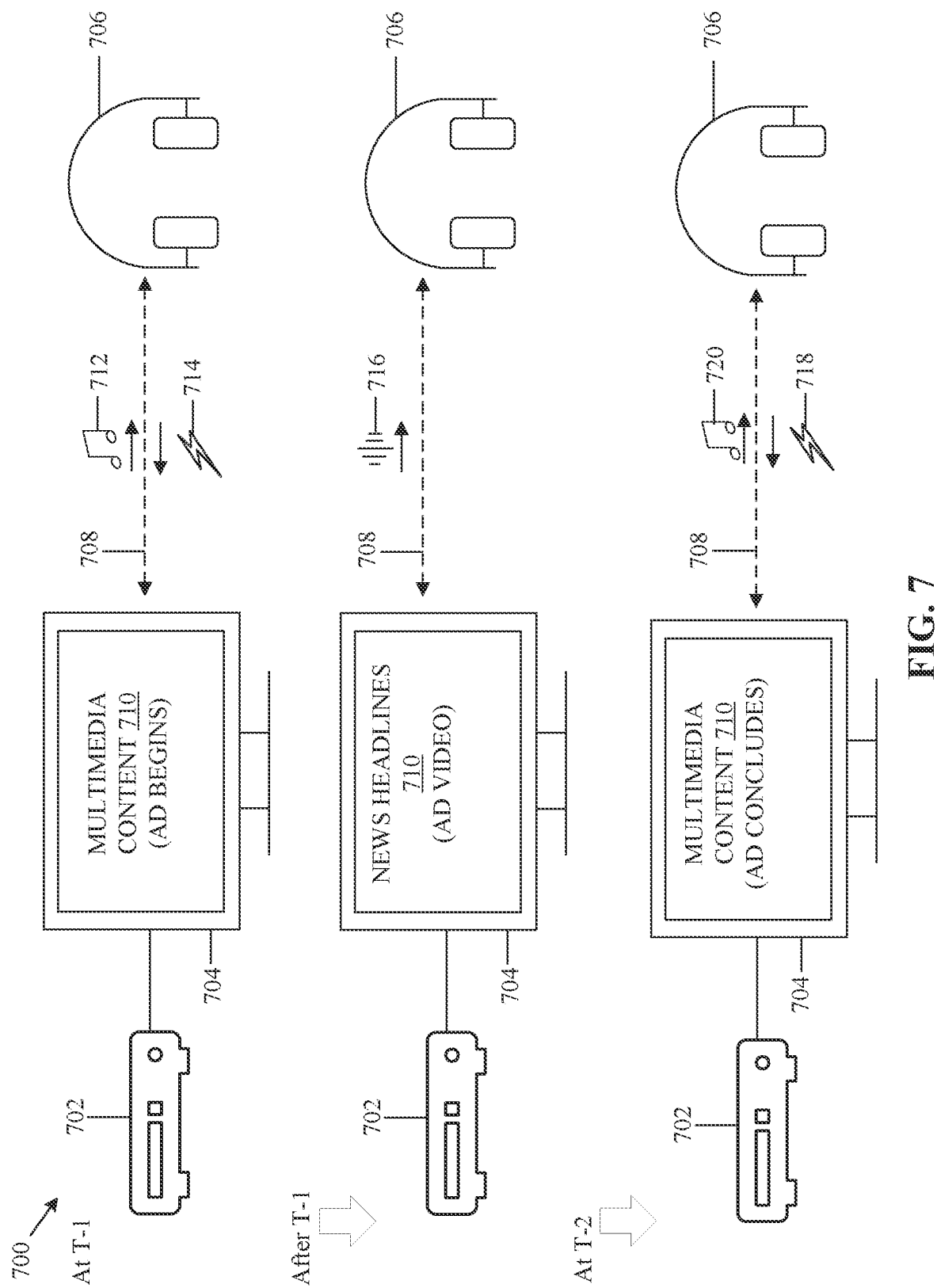
FIG. 7 is a diagram that illustrates an exemplary scenario for control of a playback of an advertisement audio based on a playback of an alternate audio, in accordance with an embodiment of the disclosure.

FIG. 7 is a diagram that illustrates an exemplary scenario for control of a playback of an advertisement audio based on a playback of an alternate audio, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700. In the exemplary scenario 700, there is shown an AV source 702, a display device 704, and an electronic apparatus 706. The implementation of the AV source 702 may be identical to that of the AV source 402 of FIG. 4. The display device 704 (for example, a television) may be an exemplary implementation of the display device 104 of FIG. 1. The functionalities of the display device 704 may be identical to that of the display device 104 of FIG. 1.

The electronic apparatus 706 (for example, a headphone) may be an exemplary implementation of the electronic apparatus 102. The functionalities of the electronic apparatus 706 may be identical to that of the electronic apparatus 102 of FIG. 1 and FIG. 2. The display device 704 may be connected to the AV source 702. The electronic apparatus 706 may be connected to the display device 704 via a wireless link 708 (for example, a Bluetooth® link). The electronic apparatus 706 may control a playback of audio content based on a playback of an alternate audio.

Prior to T-1, the display device 704 may perform playback of multimedia content 710 transmitted by the AV source 702. The multimedia content 710 may be a television program content that includes audio content and associated video content. At T-1, the electronic apparatus 706 may be configured to acquire the audio content that may be associated with the playback of the multimedia content 710 on the display device 704. The audio content may be acquired from the display device 704 via the wireless link 708 and an audio portion may be extracted from the audio content. Based on the extraction (at the instance T-1), the electronic apparatus 102 may determine that the audio portion is likely an advertisement audio 712.

The electronic apparatus 706 may further determine a location of the advertisement audio 712 in the playback timeline of the audio content associated with the multimedia content 710. The location may be determined at the instance T-1. The electronic apparatus 102 may further determine that the playback of the advertisement audio 712 commences at the instance T-1. Based on the determined location (i.e., the instance T-1), the electronic apparatus 102 may control the playback of the advertisement audio 712 via an audio reproduction device of the electronic apparatus 102. The control of the playback may be initiated from T-1 and may be controlled such that the advertisement audio 712 is inaudible for a duration of the playback of the audio content.

In accordance with an embodiment, the electronic apparatus 102 may transmit, at the instance T-1, a signal 714 (for example, a Bluetooth® signal) to the display device 704, via the wireless link 708. The signal 714 may be transmitted to control the playback of the advertisement audio 712 and may indicate to the display device 704 an instruction to initiate playback of an alternate audio 716 (for example, news headlines). The electronic apparatus 102 may control the playback of the alternate audio 716 for a period that corresponds to the determined location (i.e., the instance T-1) of the advertisement audio 712 in the playback timeline of the audio content. The period may commence at the instance T-1. After T-1, the alternate audio 716 may be the audio content associated with the multimedia content 710. The alternate audio 716 may replace the advertisement audio 712 as the audio content. Thus, the advertisement audio 712 may be inaudible in the period (that may commence at the instance T-1).

In accordance with an embodiment, the electronic apparatus 706 may select the alternate audio 716 from a set of user-preferred audio content items. The electronic apparatus 706 may receive user inputs (from the user 114) that may indicate the set of user-preferred audio content items. Alternatively, the electronic apparatus 706 may determine the set of user-preferred audio content items as output of a recommendation engine. The recommendation engine may indicate that the set of user-preferred audio content items are like the multimedia content 710, and one of the preferred audio content items may be used as the alternate audio 716.

In accordance with an embodiment, the electronic apparatus 706 may determine the period based on a duration of the advertisement audio 712. For example, the duration of the advertisement audio 712 may be such that the playback of the advertisement audio 712 concludes at an instance T-2. Based on the determination, the electronic apparatus 406 may send a signal 718 (i.e., a Bluetooth® signal), at the instance T-2, to the display device 704 to stop the playback of the alternate audio 716. Thus, the period may end at the instance T-2. Based on the signal 718, the audio reproduction device of the electronic apparatus 706 may initiate a playback of a television program audio 720 as multimedia content 710 at the instance T-2.

In some embodiments, the electronic apparatus 706 may determine (at the instance T-2) that the audio content is associated with the playback of the television program audio 720. The determination may be based on extraction of an audio portion of the audio content at T-2. The electronic apparatus 706 may be configured to extract audio portions from the audio content with a periodicity that corresponds to a period between the instances T-1 and T-2. The audio portion extracted at T-2 may not match the advertisement content stored in the database 112. Thus, the playback of television program audio 720 may be initiated at the instance T-2.

It should be noted that the scenario 700 of FIG. 7 is for exemplary purposes and should not be construed to limit the scope of the disclosure.

Figure 8:
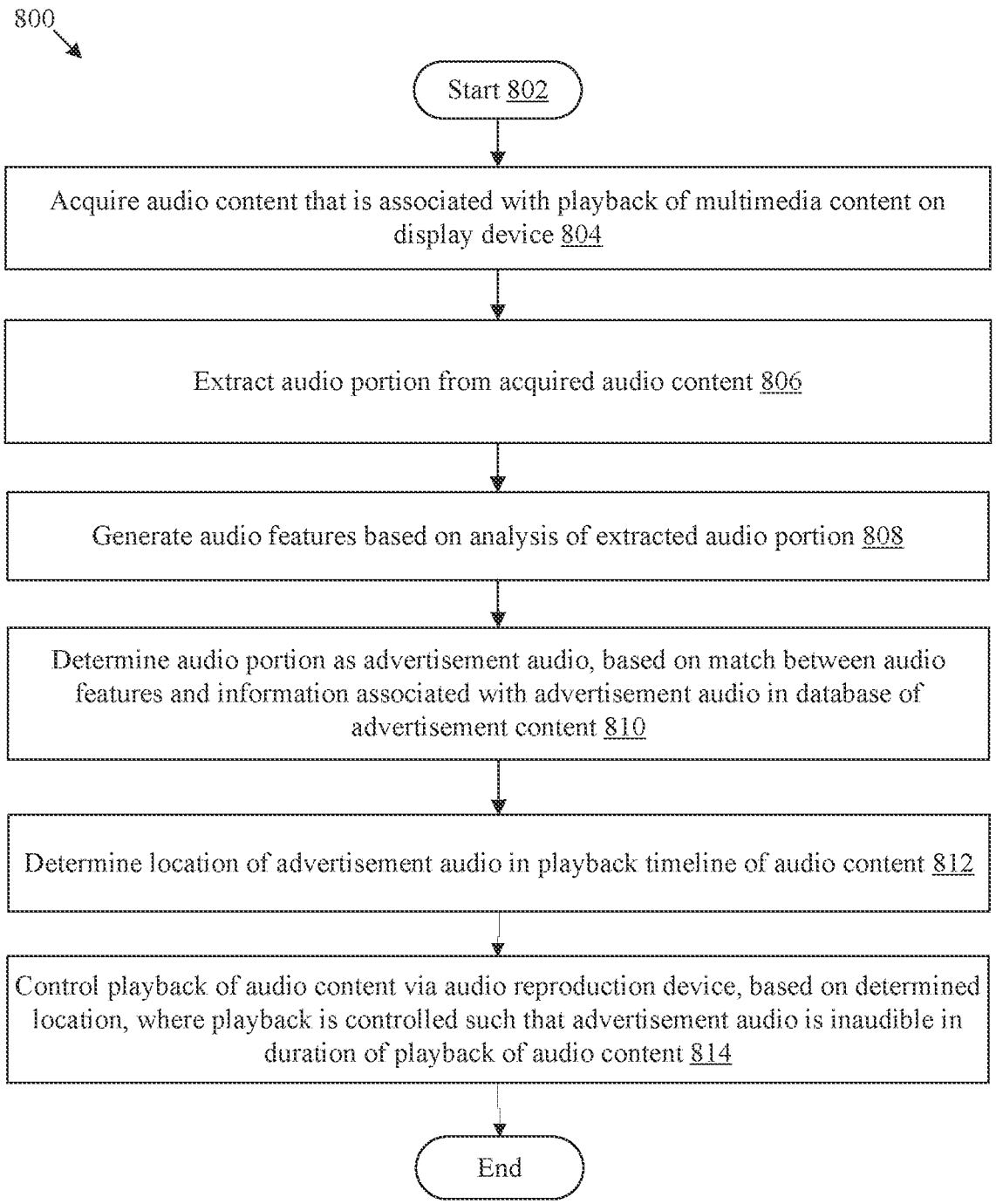
FIG. 8 is a flowchart that illustrates an exemplary method for control of playback of an audio content based on ad-related restrictions, in accordance with an embodiment of the disclosure.

FIG. 8 is a flowchart that illustrates an exemplary method for control of playback of an audio content based on ad-related restrictions, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The operations from 802 to 814 may be implemented by any computing system, such as, by the electronic apparatus 102 or the of FIG. 1 or the circuitry 202 of FIG. 2. The operations may start at 802 and may proceed to 804.

At 804, audio content associated with a playback of multimedia content on the display device 104 may be acquired. In at least one embodiment, the circuitry 202 may be configured to acquire the audio content that may be associated with the playback of the multimedia content on the display device 104. The details of acquisition of the audio content, are described, for example, in FIG. 1, FIG. 3, FIG. 4, FIG. 5, FIG. 6, and FIG. 7.

At 806, an audio portion may be extracted from the acquired audio content. In at least one embodiment, the circuitry 202 may be configured to extract the audio portion from the acquired audio content. The details of extraction of the audio portion from the audio content are described, for example, in FIG. 1 and FIG. 3.

At 808, audio features may be generated based on an analysis of the extracted audio portion. In at least one embodiment, the circuitry 202 may be configured to generate the audio features based on the analysis of the extracted audio portion. The details of generation of the audio features based on the extracted audio portion, are described, for example, in FIG. 1, and FIG. 3.

At 810, the audio portion may be determined as an advertisement audio based on a match between the audio features and information associated with the advertisement audio in a database (for example, the database 112) of advertisement content. In at least one embodiment, the circuitry 202 may be configured to determine the audio portion as the advertisement audio, based on the match between the generated audio features and the information associated with the advertisement audio stored in the database 112 of advertisement content. The details of determination of the audio portion as advertisement audio, are described, for example, in FIG. 1, FIG. 3, FIG. 4, FIG. 5, FIG. 6, and FIG. 7.

At 812, a location of the advertisement audio in a playback timeline of the audio content may be determined. In at least one embodiment, the circuitry 202 may be configured to determine the location of the advertisement audio in the playback timeline of the audio content. The details of determination of the location, are described, for example, in FIG. 1, FIG. 3, FIG. 4, FIG. 5, FIG. 6, and FIG. 7.

At 814, the playback of the audio content may be controlled, via the audio reproduction device 110, based on the determined location. In at least one embodiment, the circuitry 202 may be configured to control the playback of the audio content via the audio reproduction device 110, based on the determined location. The details of control of the playback of the audio content, are described, for example, in FIG. 1, FIG. 3, FIG. 4, FIG. 5, FIG. 6, and FIG. 7.

Although the flowchart 800 is illustrated as discrete operations, such as 804, 806, 808, 810, 812, and 814, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic apparatus (such as the electronic apparatus 102). The computer-executable instructions may cause the machine and/or computer to perform operations that include acquisition of audio content that is associated with a playback of multimedia content on the display device 104. The operations may further include extraction of an audio portion from the acquired audio content. The operations may further include generation of audio features based on analysis of the extracted audio portion. The operations may further include determination of the audio portion as an advertisement audio, based on a match between the audio features and information associated with the advertisement audio in a database (such as the database 112) of advertisement content. The operations may further include determination of a location of the advertisement audio in a playback timeline of the audio content. The operations may further include control of the playback of the audio content via the audio reproduction device 110, based on the determined location. The playback may be controlled such that the advertisement audio is inaudible in a duration of the playback of the audio content.

Exemplary aspects of the disclosure may include an electronic apparatus (such as, the electronic apparatus 102 of FIG. 1). The electronic apparatus may include circuitry (such as, the circuitry 202). The electronic apparatus 102 may further include an audio reproduction device (such as, the audio reproduction device 110). The circuitry 202 may be configured to acquire audio content that is associated with a playback of multimedia content on the display device 104. The audio content may be acquired as an input via a sound input device included in the electronic apparatus 102 or a wired audio input port included in the electronic apparatus 102, or as an output of a wireless audio codec of the electronic apparatus. The circuitry 202 may be further configured to extract an audio portion from the acquired audio content. The circuitry 202 may be further configured to generate audio features based on analysis of the extracted audio portion. The generated audio features my correspond to an audio fingerprint of the audio portion, a text transcript of speech content included in the audio portion, characteristics of the speech content, or frequency characteristics associated with the audio portion. The circuitry 202 may be further configured to determine the audio portion as an advertisement audio, based on a match between the audio features and information associated with the advertisement audio in a database (such as, the database 112) of advertisement content. The circuitry 202 may be further configured to determine a location of the advertisement audio in a playback timeline of the audio content. The circuitry 202 may be further configured to control the playback of the audio content via the audio reproduction device 110, based on the determined location. The playback may be controlled such that the advertisement audio is inaudible in a duration of the playback of the audio content. The playback of the audio content may be controlled to mute a playback of the advertisement audio for a period that corresponds to the determined location in the playback timeline.

In accordance with an embodiment, the circuitry 202 may be further configured to transmit a first signal that includes a mute instruction to the display device 104. The playback of the audio content via an audio output device, connected to the display device 104, may be controlled further based on the transmission of the first signal. The mute instruction is transmitted to indicate the determined location of the advertisement audio in the playback timeline.

In accordance with an embodiment, the circuitry 202 may be further configured to estimate a validity period of the mute instruction based on the determined location. The circuitry 202 may be further configured to transmit, after elapsing of the validity period, a second signal that includes an unmute instruction to the display device 104. The playback of the audio content may be controlled further based on the transmission of the second signal.

In accordance with an embodiment, the circuitry 202 may be further configured to control the display device 104, or an audio device connected to the display device 104, to skip a playback of an advertisement video that includes the advertisement audio. The playback of the audio content may be controlled further based the control of the display device 104 or the audio device.

In accordance with an embodiment, the circuitry 202 may be further configured to receive a user input from a user associated with the electronic apparatus 102. The user input may be a voice command. The user input may indicate a preferred schedule in which the playback of the audio content is to be controlled or a preference for the multimedia content for which the playback of the audio content is to be controlled. The playback of the audio content may be controlled further based on the received user input.

In accordance with an embodiment, the circuitry 202 may be further configured to control a playback of an alternate audio in a period that corresponds to the determined location of the advertisement audio in the playback timeline. The advertisement audio may be inaudible in the period. The circuitry 202 may be further configured to select the alternate audio from a set of user-preferred audio content items.

In accordance with an embodiment, the circuitry 202 may be further configured to extract a sample portion of the audio content that precedes the determined location of the advertisement audio in the playback timeline of the audio content. The circuitry 202 may be further configured to determine a sentiment or an emotion label for the sample portion, based on a machine learning model for a sentiment mining task or a machine learning model for an emotion classification task.

The playback of the audio content may be controlled further based on the sentiment or the emotion label.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:
    an image capture device configured to capture a plurality of images of a user;
    an audio reproduction device; and
    circuitry configured to:
        acquire audio content that is associated with a playback of multimedia content;
        extract an audio portion from the acquired audio content;
        generate a plurality of audio features based on the extracted audio portion;
        compare the plurality of audio features with specific information associated with an advertisement audio;
        determine the audio portion as the advertisement audio based on the comparison between the plurality of audio features and the specific information associated with the advertisement audio;
        determine a location of the advertisement audio in a playback timeline associated with the audio content;
        extract a sample portion of the multimedia content that precedes the location of the advertisement audio;
        determine an emotion label for the sample portion; and
        determine an emotional state of the user during a playback of a first portion of the advertisement audio, wherein
            the determination of the emotional state is based on the plurality of images,
            the audio reproduction device is configured to control a playback of the audio content based on a comparison of the emotion label for the sample portion and the emotional state of the user, and
            the playback of the audio content is controlled such that a second portion of the advertisement audio is inaudible in a duration of the playback of the audio content.

2. The electronic apparatus according to claim 1, further comprising:
    a sound input device; and
    a wired audio input port, wherein the circuitry is further configured to acquire an input from one of the sound input device or the wired audio input port.

3. The electronic apparatus according to claim 1, wherein the generated plurality of audio features corresponds to at least one of:
    an audio fingerprint of the audio portion,
    a text transcript of speech content included in the audio portion,
    characteristics of the speech content, or
    frequency characteristics associated with the audio portion.

4. The electronic apparatus according to claim 1, wherein the audio reproduction device is further configured to mute the playback of the advertisement audio for a specific period, and
    the specific period corresponds to the determined location in the playback timeline.

5. The electronic apparatus according to claim 1, wherein the circuitry is further configured to transmit a first signal to a display device that displays the multimedia content,
    the first signal includes a mute instruction,
    the audio reproduction device is further configured to control the playback of the audio content based on the transmission of the first signal, and
    the mute instruction is associated with the determined location of the advertisement audio in the playback timeline.

6. The electronic apparatus according to claim 5, wherein the circuitry is further configured to:
    determine a validity period of the mute instruction based on the determined location; and
    transmit, after an elapse of the validity period, a second signal to the display device,
    the second signal includes an unmute instruction, and
    the audio reproduction device is further configured to control the second playback of the audio content based on the transmission of the second signal.

7. The electronic apparatus according to claim 1, wherein the audio reproduction device is further configured to skip a playback of an advertisement video that includes the advertisement audio, and
    the audio reproduction device is further configured to control the playback of the audio content based on the skipped playback of the advertisement video.

8. The electronic apparatus according to claim 1, wherein the circuitry is further configured to:
    receive a user input from the user, wherein the user input indicates one of a preferred schedule associated with the playback of the audio content or a preference for the multimedia content; and
    extract the audio portion from the acquired audio content at a specific time interval during one of the preferred schedule or a broadcast time period of the multimedia content.

9. The electronic apparatus according to claim 8, wherein the user input is a voice command.

10. The electronic apparatus according to claim 1, wherein
the circuitry is further configured to control a playback of an alternate audio for a specific period that corresponds to the determined location of the advertisement audio in the playback timeline, and
the advertisement audio is inaudible in the specific period.

11. The electronic apparatus according to claim 10, wherein the circuitry is further configured to select the alternate audio from a set of user-preferred audio content items.

12. The electronic apparatus according to claim 1, wherein the circuitry is further configured to
determine the emotion label for the sample portion, based on application of a machine learning model on audio frames of the sample portion.

13. A method, comprising:
controlling an image capture device to capture a plurality of images of a user;
acquiring audio content that is associated with a playback of multimedia content;
extracting an audio portion from the acquired audio content;
generating a plurality of audio features based on the extracted audio portion;
comparing the plurality of audio features with specific information associated with an advertisement audio;
determining the audio portion as the advertisement audio based on the comparison between the plurality of audio features and the specific information associated with the advertisement audio;
determining a location of the advertisement audio in a playback timeline associated with the audio content;
extracting a sample portion of the multimedia content that precedes the location of the advertisement audio;
determining an emotion label for the sample portion;
determining an emotional state of the user during a playback of a first portion of the advertisement audio, wherein the determination of the emotional state is based on the plurality of images; and
controlling a playback of the audio content based on a comparison of the emotion label for the sample portion and the emotional state of the user,
wherein the playback of the audio content is controlled such that a second portion of the advertisement audio is inaudible in a duration of the playback of the audio content.

14. The method according to claim 13, further comprising
muting the playback of the advertisement audio for a specific period, wherein
the specific period corresponds to the determined location in the playback timeline.

15. The method according to claim 13, further comprising:
transmitting a first signal to a display device that displays the multimedia content, wherein the first signal includes a mute instruction; and
controlling the playback of the audio content based on the transmission of the first signal, wherein the mute instruction is associated with the determined location of the advertisement audio in the playback timeline.

16. The method according to claim 15, further comprising:
determining a validity period of the mute instruction based on the determined location;
transmitting, after an elapse of the validity period, a second signal to the display device, wherein the second signal includes an unmute instruction; and
controlling the playback of the audio content based on the transmission of the second signal.

17. The method according to claim 13, further comprising:
skipping a playback of an advertisement video that includes the advertisement audio; and
controlling the playback of the audio content based on the skipping of the playback of the advertisement video.

18. The method according to claim 13, further comprising:
receiving a user input from the user, wherein the user input indicates one of a preferred schedule associated with the playback of the audio content or a preference for the multimedia content; and
extracting the audio portion from the acquired audio content at a specific time interval during one of the preferred schedule or a broadcast time period of the multimedia content.

19. The method according to claim 13, further comprising
controlling a playback of an alternate audio for a specific period that corresponds to the determined location of the advertisement audio in the playback timeline, wherein the advertisement audio is inaudible in the specific period.

20. A non-transitory computer-readable medium having stored thereon, computer-executable instructions which, when executed by an electronic apparatus, cause the electronic apparatus to execute operations, the operations comprising:
controlling an image capture device to capture a plurality of images of a user;
acquiring audio content that is associated with a first playback of multimedia content;
extracting an audio portion from the acquired audio content;
generating a plurality of audio features based on the extracted audio portion;
comparing the plurality of audio features with specific information associated with an advertisement audio;
determining the audio portion as the advertisement audio based on the comparison between the plurality of audio features and the specific information associated with the advertisement audio;
determining a location of the advertisement audio in a playback timeline associated with the audio content;
extracting a sample portion of the multimedia content that precedes the location of the advertisement audio;
determining an emotion label for the sample portion;
determining an emotional state of the user during a playback of a first portion of the advertisement audio, wherein the determination of the emotional state is based on the plurality of images; and
controlling a playback of the audio content based on a comparison of the emotion label for the sample portion and the emotional state of the user,
wherein the playback of the audio content is controlled such that a second portion of the advertisement audio is inaudible in a duration of the playback of the audio content.

* * * * *